Feb. 15, 1966

W. S. BLUME 3,235,675

MAGNETIC MATERIAL AND SOUND REPRODUCING DEVICE CONSTRUCTED THEREFROM

Filed Dec. 23, 1954

2 Sheets-Sheet 1

INVENTOR

WALTER S. BLUME

BY Parker and Walsh

ATTORNEY

Feb. 15, 1966 W. S. BLUME 3,235,675

MAGNETIC MATERIAL AND SOUND REPRODUCING DEVICE CONSTRUCTED THEREFROM

Filed Dec. 23, 1954

2 Sheets-Sheet 2

WALTER S. BLUME

BY Parker and Walsh

ATTORNEYS 3,235,675
Patented Feb. 15, 1966

3,235,675

MAGNETIC MATERIAL AND SOUND REPRODUCING DEVICE CONSTRUCTED THEREFROM

Walter S. Blume, Cincinnati, Ohio, assignor to Leyman Corporation, Cincinnati, Ohio, a corporation of Ohio Filed Dec. 23, 1954, Ser. No. 477,241
10 Claims. (Cl. 179—115)

The present invention relates generally to the field of magnetism and is more particularly directed to a new and improved magnetic material possessing novel magnetic as well as physical properties together with certain novel apparatus in which such material may be employed to advantage.

As is well known to those skilled in the art, most of the modern magnetic materials which possess the requisite characteristics of high retentivity, coercive force, and high energy product necessary for effective utilization in the form of what are known in the art as "commercial permanent magnets," likewise possess certain undesirable physical properties which render them particularly difficult to handle in the economical fabrication of useful magnetic devices. For example, many of these highly retentive permanent magnet materials are produced by a process of sintering a mixture of elements or compounds in powder form under heat and/or pressure, the end product generally being extremely hard, brittle and practically unmachinable. On the other hand, one of the principal fields of utility in which such permanent magnet materials find relatively wide application is the art of sound reproduction wherein the ability to mold, cut, machine or otherwise form the magnetic portions of the usual sound reproducing apparatus would be distinctly advantageous and would materially reduce the cost as well as improve the characteristics of such devices.

It is accordingly a principal object of the present invention to provide a new and improved magnetic material possessing a combination of novel magnetic and physical properties.

Another object of the invention is to provide a novel magnetic material formed from a mixture of ferromagnetic particles dispersed within a plastic binder wherein a portion of the individual particles of magnetic material are so shaped as to effectively reduce the magnetic leakage between the individual particles whereby to maintain, by unified interaction, a mutual magnetic support among such particles substantially parallel to the original direction of magnetization.

A further object of the invention is to provide a novel method of producing a new and improved magnetic material having a combination of unusual physical and magnetic properties.

An additional object of the invention is to provide improved sound reproducing devices employing in the magnetic circuits thereof novel magnetic materials.

Yet another object of the invention is to provide a sound reproducing device of novel construction employing new magnetic materials possessing unusual physical and magnetic properties.

A still further object of the invention is to provide a novel method of reproducing sound.

The foregoing, as well as other and further objects and advantages of the present invention will become more readily apparent to one skilled in the art from a consideration of the following detailed specification taken in conjunction with the accompanying figures of drawing illustrating preferred embodiments thereof wherein.

Figures 6A, 6B, 6C:
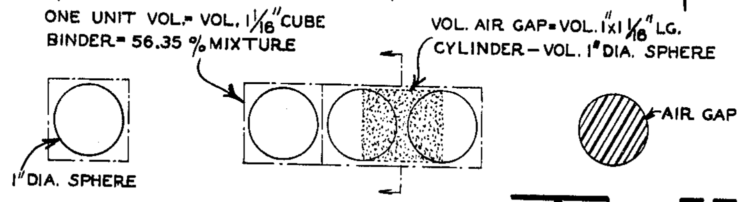

FIGURES 6, 7 and 8 are related diagrammatic illustrations, each in three parts, *a*, *b*, and *c*, showing schematically to a greatly enlarged scale the concept of particle orientation in relation to magnetic air gap in composite magnetic materials in accordance with the present invention; and FIGURE 9 is a diagrammatic view in chart form illustrating certain of the properties of a composite magnetic material in accordance with the present invention.

As is well understood by those skilled in the art, materials which exhibit magnetic properties are generally divided into two distinct categories in accordance with what appears to be a fairly clear line of division between the properties thereof. For example, "The Standard Handbook for Electrical Engineers," eighth edition, divides ferromagnetic materials into two different categories defined as "retentive" and "non-retentive" materials. In general, the non-retentive materials are characterized by a relatively high permeability and a correspondingly low coercive force, whereas those materials which are commonly referred to as commercial permanent magnets are characterized by a relatively low permeability coupled with a correspondingly high coercive force. The other magnetic properties of the different categories of magnetic materials likewise generally follow the natural line of division, the non-retentive materials being capable of magnetization and demagnetization with a minimum loss of energy (hysteresis) and acting as efficient magnetic conductors, whereas the retentive materials possess an inherent ability to maintain magnetization under adverse influences and therefore qualify as efficient providers rather than conductors of magnetic flux. Thus, both the coercive forces and energy products of those materials known as permanent magnets are quite high, whereas in the case of those materials generally referred to as "non-retentive" the coercive forces and energy products are of such minor quantity that the values thereof, as such, are not customarily listed in standard engineering handbooks.

It is equally well known that magnetic materials of the two different categories referred to above are not interchangeable as applied to specific devices. For example, in the case of a conventional earphone or telephone receiver of the type used in either wire or radio telephony, the instrument usually has a frequency response ranging from approximately 200 to 4,000 c.p.s., and comprises a permanent magnet surrounded by a coil of wire within a housing, the magnet poles being positioned closely adjacent to, but not touching, a thin ferromagnetic diaphragm. A permanent magnet is employed for the purpose of stressing the diaphragm toward the magnetic structure by means of the permanent magnetic field since, otherwise, two motions would be imparted to the diaphragm by each signal cycle thus doubling the frequency of reproduction. As in the case of many electronic instruments, therefore, it is highly important in such sound reproducing devices that the magnetic material employed be of the "permanent magnet" type.

It will be understood, of course, that the foregoing reference to an earphone or telephone receiver is resorted to solely for the purpose of illustration since the same criteria will apply in the case of substantially all useful devices employing magnetic materials. For example, the selection of a proper magnetic material is equally important in substantially all sound reproducing devices such as the miniature earphones used by secretaries and telephone operators, the devices used in connection with hearing aids as well as the less expensive earphones employed in toy telephones or toy communication devices. The magnetic materials that fall into the two respective categories referred to above are well known in the art and it is sufficient to say that the Permalloys are characteristic of the non-retentive materials while the Alnicos are characteristic of the permanent magnet materials of high retentivity.

Referring again to a sound reproducing device such as the conventional earphone receiver, it is generally understood that such devices include a plastic housing or case which has been molded or machined to proper dimensions, a permanent magnet manufactured to specifications and suitably secured within the case, a coil of insulated wire conductor, non-retentive legs provided with suitable insulation, a non-retentive diaphragm, and a magnetic shunt, together with a number of suitable devices for securing the entire assembly together. As will be readily apparent, the fabrication of such a device involves numerous manufacturing and assembly operations and, if the end product is to operate satisfactorily, considerable care and skill must be devoted both to the preliminary engineering and to each step of the manufacturing operation. Where the earphone is reduced in size, the difficulty of manufacture is, if anything, increased rather than diminished.

In the manufacture of an earphone of the type just described, it is possible to mold, machine or otherwise suitably shape practically all of the individual elements of the assembly in such manner that they may be fitted together in a proper manner. The exception, however, is found in the case of the permanent magnet which, as indicated above, is required in order to produce an operative device but which, as customarily produced, is inherently incapable of being machined or worked upon by the earphone manufacturer in view of its hardness, brittleness, and other generally undesirable physical properties.

In order to overcome the foregoing difficulties, I have found that when finely divided magnetic material is incorporated under certain conditions into a moldable plastic and the mixture is molded into a desired shape, the resulting molded product has many of the desired magnetic properties of the original magnetic material in massive form and in addition certain other properties inherent in molded plastic materials. Subsequent reference will be made to the particular magnetic material that I prefer to employ. The plastic materials may be of the rubbery type such as natural rubber, buna-*n*, buna-*s*, butyl rubber, polychloroprene or analogous materials. Also the more conventional moldable plastics of all types such as phenolic, urea, polystyrene, cellulose esters, and the vinyls may be employed according to the particular external physical properties desired. The selection of the plastic material employed will depend largely upon the desired physical properties of the magnetic material. The ratio of magnetic material to plastic material may vary considerably according to the relative specific gravity of the plastic and the particle size of the magnetic material. Although for some purposes as little as ten percent of the weight of the finished body may be magnetic material, it is possible, in accordance with the present invention, to use a relatively large amount of magnetic material consistent with a substantially continuous phase of plastic binder.

With respect to the particular magnetic material to be incorporated in finely divided form into the plastic matrix, I have found that while non-retentive materials may be employed without particular regard to other conditions, in order to produce an effective or practically useable permanent magnet from a mixture of permanent magnet material and plastic, it is necessary to take into account another very important consideration, namely, the shape of the individual particles of the magnetic material. In this connection, it should be noted that in accordance with the generally accepted theory, the coercive forces of a permanent magnet are normally considered to increase as the particle size of the individual particles of ferro-magnetic material decreases approaching the domain particle size.

It is my theory that the apparent loss of properties of a permanent magnet material of a given alloy which has been converted into a finely divided state and dispersed in a plastic binder does not constitute any actual loss of properties in the individual particles but rather occurs as the result of magnetic leakage and reluctance developing at the intervals between particles. In accordance with this theory it is obvious that as the size of the individual particles of magnetic material is reduced, the number of poles or points at which internal leakage can occur in any given mass of powdered magnetic material becomes greater. This point is of particular significance in view of the fact that it is highly desirable to use as small particles of magnetic material as possible in order to avoid an undue weakening of the physical properties of the particular plastic in which the magnetic particles are dispersed.

It is obviously desirable to employ the minimum amount of plastic material consistent with continuity of the plastic phase and physical strength of the molded product since by so doing, the gaps between the particles are held to a minimum and thus the overall internal magnetic leakage, and reluctance are minimized. Where magnetic powder is obtained without specific effort to obtain particles of a given shape, it must be assumed that the particles are of random and irregular shape tending to average out to a more or less spherical shape. This condition is not ideal since an inscribed sphere only occupies .524 of the cube within which it is inscribed. This permits a great deal of internal magnetic leakage to take place. A more desirable condition is that which prevails when the particles have a minimum of two relatively flat opposing surfaces. The most suitable particle shape considering ease of procurement, is that of the short, right cylinder. Such a cylinder occupies .7854 of the volume of a circumscribed cube, more than fifty percent greater than that of the corresponding sphere.

One of the known properties of magnetic materials is commonly referred to as anisotropy and relates generally to the ability of the material, for any of a number of reasons such as crystalline structure or the like, to exhibit improved magnetic characteristics in one direction as compared to other directions through the material. Another known type of anisotropy is generally referred to as "anisotropy of shape" and is normally defined as that property of a ferromagnetic material producing, by reason of the shape of the material, a preferred orientation such that the magnetic characteristics are better along one axis than along any other axis. With respect to finely divided ferromagnetic material, I have discovered that there is another property which may also be described as anisotropy of shape but which does not answer the foregoing definition. This property is the characteristic of certain ferromagnetic particles having, by reason of shape but independent of orientation, the ability to maintain a favorable and unified flow of magnetic flux through the intervening air gaps of a properly divided powdered mass, consistent with and complementary to magnetization, whatever the direction.

In order to distinguish this newly discovered property from the usual definition of "anisotropy of shape," I shall refer to it as "particulate anisotropy." As suggested above, discs and short right prisms possess this desirable property although failing to answer the conventional definition of anisotropy of shape. On the other hand, an ellipsoid which would fulfill the requirement of the conventional definition of anisotropy of shape would fail to satisfy the requirement of particulate anisotropy. Cylinders, needles, long right prisms and rectangular parallelepipedons fulfill both definitions.

Of the shapes above enumerated, the short cylinder is one of the easiest to attain in moderately uniform conditions. By extruding one of the Alnico type alloys in barely molten form slightly above the melting point thereof through a spinnerette-like die and breaking up the extruded streams as they issue from the spinnerette on the point of incipient solidification, the resultant particles will tend to predominate in the desired right cylindrical shape.

Although, as previously indicated, most of the commercial permanent magnet alloys are considered to be brittle and unmachinable, particles of the approximate desired shape may also be obtained by heating particles of the desired particle weight to the narrow range of partial ductility and working the particles by flattening them en masse.

The specific method used for obtaining particles of the desired shape and size does not per se form a part of the present invention and the foregoing illustrations are given only by way of example.

As indicated above, particles of magnetic material having at least two generally parallel opposed faces exhibit the characteristic of particulate anisotropy when dispersed in a plastic binder or matrix. It is to be clearly understood, however, that the critical condition involved relates to what is known in the art as the "air gap" between individual particles and that the characteristic of the material which may be measured by the effective air gap between the particles does not involve the relative proportions of magnetic material and plastic in the mixture. In other words, the ratio of magnetic material to plastic in the resultant compound is a measure of the physical properties of the material but does not serve as a correct index of the magnetic properties of the material as to which further consideration of the effective air gap between particles must be given. In accordance with the principles of the present invention, the total sum of the air gaps separating the individual particles of magnetic material in any given line parallel to the direction of magnetization should preferably be less than the effective total of the individual air gaps of the magnetic circuits which tend to develop independently about each particle of magnetic material.

Figures 7A, 7B, 7C:
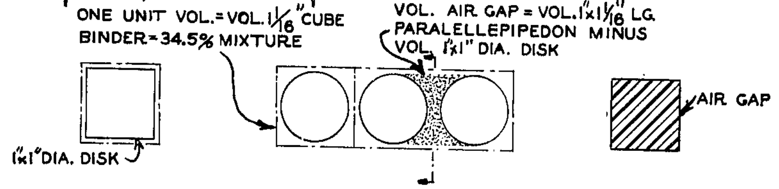
Figures 8A, 8B, 8C:
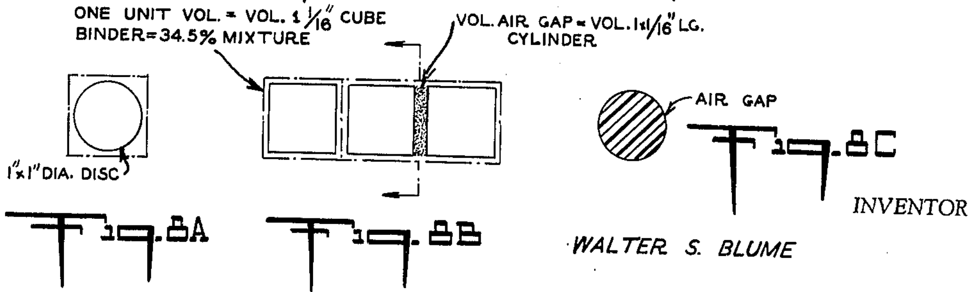

In order to illustrate the concept of particulate anisotropy and its relation to air gap analysis, reference may be had to FIGURES 6*a*, 6*b*, 6*c*, 7*a*, 7*b*, 7*c*, 8*a*, 8*b* and 8*c*. As shown schematically in FIGURE 6*b*, a fragment of composite magnetic material is assumed to include three spherical particles of a permanent magnet material spaced 1/16 of an inch apart in a solid mass of plastic which may be divided into three individual cubes. The volume of each air gap in such a progression of one inch spheres is the apparent difference between the volume of one sphere and the volume of a cylinder one inch in diameter and 1 1/16 inches long and, in the example given, would equal .31088 cubic inch. In FIGURE 7*b*, the individual particles of permanent magnet material are assumed to have the shape of short right cylinders lying side by side in a mass of plastic as in FIGURE 6*b*. In this case, the volume of each air gap at the same spacing of 1/16 of an inch would be the apparent difference between the volume of one disc and the volume of a rectangular parallelepipedon one inch by one inch by 1/16 inch and equals .27710 cubic inch. The arrangement of the discs or short right cylinders in FIGURE 7*b* has been deliberately chosen to illustrate the condition of orientation most unfavorable to such particle shapes, that is, the orientation presenting the largest air gap between the particles. In FIGURE 8*b* the same shape particles are shown arranged end to end with the same 1/16 inch spacing between particles. This is the condition of most favorable orientation and the volume of each air gap is simply the apparent volume of a cylinder one inch in diameter and 1/16 inch long, equal to .04909 cubic inch.

In order to more clearly illustrate the relationship between the relative proportions of materials in a mixture of magnetic and nonmagnetic substances and the air gap analysis discussed above, reference may be had to FIGURE 9 wherein the percentage proportions of the materials are represented along the bottom line of the chart while the air gap analysis is plotted as an ordinate. The notation "*M/G*" is the actual measuring unit which I have employed for the purpose of analyzing the effective air gap between particles in a mixture and constitutes a ratio between the volume of the ferromagnetic particle "M" and the volume of the air gap between adjacent particles "G." As clearly shown in FIGURE 9, the maximum values of *M/G* at the most favorable spacing ratio possible, that is, with the particles actually in contact, in the case of a spheroid cannot exceed approximately 2 regardless of how much additional magnetic material is added to the mixture beyond that quantity necessary to reach the given value. In other words, any increase in the proportion of magnetic material to binder in the mixture in the absence of compression, can never increase the value of *M/G* beyond 2 if the particles are spheroids. By way of contrast, in the case of either unfavorably orientated discs or favorably orientated discs (or the more likely average of random orientation) much larger values of *M/G*, representing usable magnetic properties, can be obtained over a useful range of mixture proportions. Translated into simple terms, the chart of FIGURE 9 thus illustrates that by employing particles of magnetic material in the shape of discs, the physical properties of the mixture in such particles with a plastic binder may be varied considerably while still maintaining a useful range of magnetic properties as measured by the *M/G* ratio. Conversely, the chart of FIGURE 9 illustrates that for any given mixture proportion and its resultant physical properties, the magnetic properties may be improved by varying particle shape and orientation.

Figure 1:
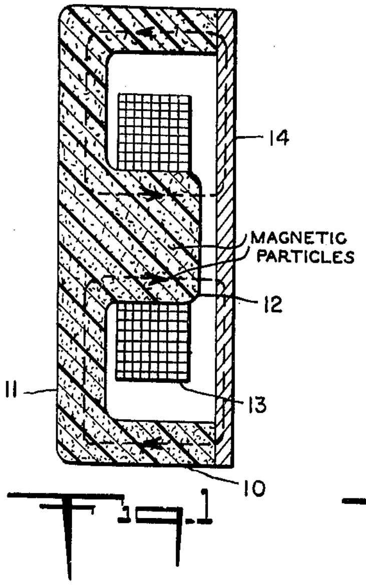
FIGURE 1 is a somewhat schematic view in cross-section of a sound reproducing device of generally conventional design but employing the novel magnetic material in accordance with the present invention.

As disclosed in FIGURE 1, my invention may be employed to form a sound reproducing device shown as a more or less conventional earphone receiver. Instead of a conventional magnetic body of predetermined shape being either placed in a case prepared for it or having a case molded around it, in my invention a mixture of a permanent magnet powder displaying particulate anisotropic characteristics and plastic is molded to form the hollow cylindrical shell 10, which is open at one face and closed at the other, or rear, face 11, the rear face and shell preferably being integral. A centrally located core 12 extends inwardly from the rear face 11, this core terminating short of the open end of the shell. It is preferable that the shell 10, rear face 11 and core 12 comprise a unitary molding. A coil 13 of electrically conductive wire surrounds core 12, and a conventional, thin, disc-shaped diaphragm 14 is mounted in spaced relation to the core 12 and the open end of the shell 10. For simplicity, lead-in wires and the conventional cap are not shown.

Figure 2:
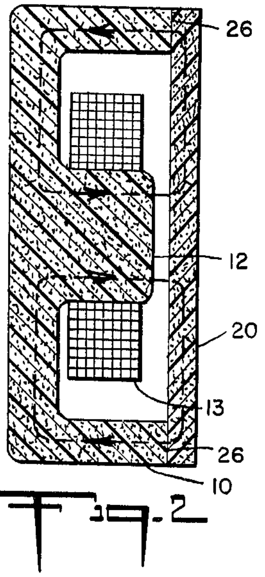
FIGURE 2 is a cross-sectional view through a generally conventional sound reproducing device similar to FIGURE 1 but wherein both the housing and diaphragm employ a novel magnetic material in accordance with the present invention.

As shown in FIGURE 2 the conventional diaphragm 14 disclosed above may be replaced by a molded diaphragm, indicated at 20 in the drawing, formed of plastic material and ferromagnetic particles lacking in retentivity. Such a molded diaphragm may be secured to the body 10 by means of a line of cement 26 resulting in a permanently sealed ear piece that does not require the use of a cap.

Mere moldability to specific shape is not, however, the only advantage of these new materials. The property of magnetic materials changing in shape and dimension due to magnetization is known as magnetostriction. Although these changes in ordinary magnetic materials are measurable, they are small in substantially every case ranging generally from one to ten parts in one hundred thousand. The materials of this invention, due to their composite character, react dimensionally far more strongly to variations in flux. This is illustrated graphically in the schematic showing of FIGURE 5. As shown at (a), each particle of plastic located between two magnetic particles is normally slightly compressed due to the attraction between the two magnetic particles. With the application of an external variation in the flux, as illustrated by the sine wave below the enlarged illustrations, at (b) the field becomes weakened and the particle elongates vertically due to the reduction in compression force. With the sine wave returned to zero the condition varies from (b) to (a) again and then as the field is strengthened as shown at (c), the plastic is subjected to extended compression. With the return of the sine wave to zero again, the condition of (a) is restored.

While the property just described appears to be somewhat similar to the known property of magnetostriction, it is to be clearly understood that the dimensional reaction to flux variation which occurs in the composite materials in accordance with the present invention is to a vastly larger scale and does not refer to magnetostrictive changes in the individual particles of magnetic material within the composite mass. In other words, the three dimensional variation which occurs in the materials of the present invention under conditions of changing flux represents a change in volume of the material itself and permits a new approach to the entire concept of producing audible sound waves.

Figure 3:
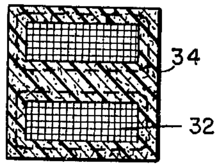
FIGURE 3 is a longitudinal cross-sectional view, somewhat schematic in form, taken through a preferred embodiment of sound reproducing device of novel design employing the improved magnetic material in accordance with the present invention.
Figure 4:
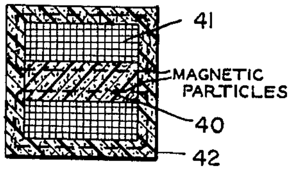
FIGURE 4 is a longitudinal cross-sectional view similar to FIGURE 3 but illustrating a modified form of sound reproducing device in accordance with the present invention.
Figures 3, 5:
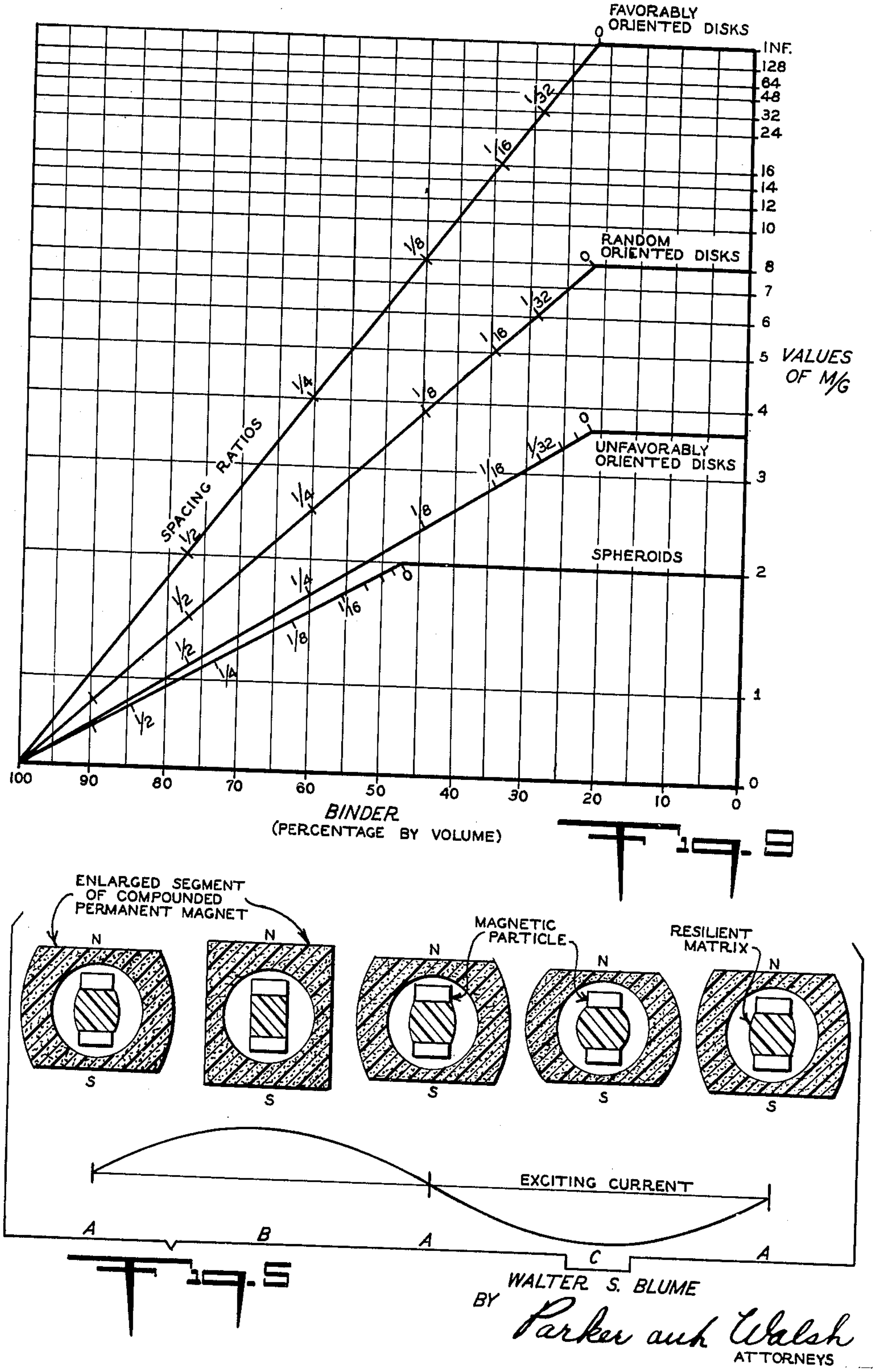
FIGURE 5 is an entirely schematic illustration, in chart form, depicting one of the novel properties of the magnetic material in accordance with the present invention.

As shown in FIGURE 3, this property, which may be referred to as artificial magnetostriction, is utilized to form a small, molded-to-shape receiver which may be suitably dimensioned so as to fit within the ear of the user. The receiver comprises an electric conductor in the form of a coil 32 of insulated wire about which has been molded a solid body 34 of a magnetic material comprising finely divided particles of a known magnetic material dispersed in a plastic binder. As in the previous figures, the usual lead-in wires have not been shown although, in each of FIGURES 1, 2 and 3, the magnetic circuits have been represented by broken lines having arrows to show the direction of flow of magnetic flux. As shown in FIGURE 4, the receiver may be formed in two molded parts: a central core 40 made of plastic having particulately anisotropic particles of a permanent magnetic material dispersed therein, extending through the middle of the coil 41, and an enclosing housing 42 made of a non-retentive material.

With reference to the small receivers of both FIGURES 3 and 4, it is to be noted that the construction permits molding in a single waterproof piece so that they may be used with a great deal more freedom than in the case of presently known constructions. It should also be understood that the dimensional reaction to flux variation which occurs in the constructions of FIGURES 3 and 4 is a three dimensional or volumetric reaction and differs from known methods of producing sound which employ at most a two dimensional change in the vibrating or oscillating material. Obviously the method of producing sound through "artificial magnetostriction" differs from such volumetric changes as may occur, for example, in a vibrating column of air, by reason of the fact that the sound vibrations are produced by the three dimensional reaction of a solid body. While I prefer to employ the above mentioned principle of particulate anisotropy in the material utilized in FIGURE 3 and the body of FIGURE 4, the principle of three dimensional variation is independent of the shape of the individual particles of known magnetic material mixed with the plastic binder.

While I have shown and described herein certain preferred embodiments of my invention solely for the purpose of illustration, it will be understood that numerous modifications, alterations, and deviations from these specific disclosures will occur to those skilled in the art without departing from the principles of the invention as set forth in the following claims.

I claim:

1. A sound reproducing device comprising a generally hollow cylindrical housing open at one face and closed at the other face thereof, a central core extending inwardly from said closed face, a diaphragm in engagement with the peripheral edges of said open face in spaced relation to said core, and a coil of insulated wire surrounding said core within said housing and adapted to conduct electric current therethrough, said housing, core and diaphragm comprising moldings of a resiliently deformable dispersion of particles in a plastic matrix, in which dispersion a substantial portion of said particles are short right cylinders of a permanent magnetic material.

2. A sound reproducing device comprising a generally hollow cylindrical housing open at one face and closed at the other face thereof, a central core extending inwardly from said closed face, a magnetically responsive diaphragm in engagement with the peripheral edges of said open face in spaced relation to said core, and a coil surrounding said core within said housing adapted to conduct electric current therethrough, said housing and core comprising a unitary molding of a resiliently deformable dispersion of particles of a permanent magnetic material in a plastic matrix, in which dispersion a substantial portion of said particles are short right cylinders.

3. A sound reproducing device comprising a housing provided with a central core, a diaphragm mounted on said housing in spaced relation to said core, and a coil surrounding said core within said housing adapted to conduct electric current therethrough, said housing and said core comprising a unitary molding of a mixture of ferromagnetic particles dispersed substantially uniformly throughout a plastic matrix, in which mixture a substantial portion of said particles are short right cylinders.

4. A sound reproducing device comprising a housing provided with a core, a diaphragm mounted on said housing in spaced relation to said core, and an electric conductor surrounding said core, said housing and core comprising a molding of a dispersion of ferromagnetic particles in a plastic matrix, in which dispersion a substantial portion of said particles have at least two generally parallel opposed faces.

5. A sound reproducing device comprising a coil of insulated wire adapted to conduct electric current therethrough completely encased in a solid cylindrical body, the central inner portion of which passes through said coil forming a core for the latter, said body comprising a molding around said coil of a resiliently deformable mixture which is a substantially uniform dispersion of particles of a permanent magnetic material in a plastic matrix, in which mixture a substantial portion of said particles are short right cylinders.

6. A sound reproducing device comprising an electric conductor encased in a solid cylindrical body, in which said body comprises a molding around said conductor, the material of said body is a resiliently deformable dispersion of ferromagnetic particles in a plastic matrix, said particles are formed of a permanent magnet material, and a substantial portion of said particles are short right cylinders having a length no greater than their width.

7. A sound reproducing device comprising an electric conductor encased in a solid cylindrical body, said body comprising an integral molding about said conductor, in which the material of said body is a resiliently deformable dispersion of permanently magnetic particles in a plastic matrix, and in which a substantial portion of said particles have at least two generally parallel opposed faces the distance between which is no greater than the dimension across said faces.

8. A permanent material comprising a dispersion of particles of a permanent magnet material in a non-magnetic matrix, a substantial portion of said particles having two substantially parallel opposed faces the distance between which is no greater than the dimension across said faces.

9. A permanent magnet material comprising a dispersion of small bodies of a permanent magnet material in a non-magnetic binder, said particles being in the form of right cylinders and having a length to width ratio of no more than about one.

10. A permanent magnet material comprising a dispersion of small discs of permanent magnet material in a non-magnetic molded binder, said discs having opposite faces lying in parallel planes and having a thickness no greater than the width of said faces.

References Cited by the Examiner

UNITED STATES PATENTS

| | | | |
|---|---|---|---|
| 201,488 | 3/1878 | Bell | 179—120 |
| 1,026,196 | 5/1912 | Beck | 179—112 |
| 1,096,127 | 5/1914 | Rosenberg | 179—114 |
| 1,559,596 | 11/1925 | Williams | 179—120 |
| 1,981,468 | 11/1934 | Roseby | 336—233 |
| 1,982,689 | 12/1934 | Polydoroff | 336—233 |
| 2,064,773 | 12/1936 | Vogt | 336—233 |
| 2,188,091 | 1/1940 | Baermann | 377—201 |
| 2,220,126 | 11/1940 | Six | 336—83 |
| 2,532,876 | 12/1950 | Asche et al. | 336—233 |
| 2,589,766 | 3/1952 | Bradley | 317—198 |
| 2,638,567 | 5/1953 | Cronin | 179—153 |
| 2,761,077 | 8/1956 | Harris | 179—110 |
| 2,786,983 | 3/1957 | Hill | 336—83 |
| 3,024,392 | 3/1962 | Baermann | 317—159 |

FOREIGN PATENTS

| | | |
|---|---|---|
| 631,312 | 11/1949 | Great Britain. |

BERNARD A. GILHEANY, *Primary Examiner.*

NEWTON N. LOVEWELL, ROBERT H. ROSE, L. M. ANDRUS, JOHN F. BURNS, E. JAMES SAX, *Examiners.*

R. R. SCHLEMMER, H. W. GARNER, R. M. GOLDMAN, *Assistant Examiners.*